J. F. NETTLE.
RESILIENT WHEEL.
APPLICATION FILED NOV. 7, 1913.
1,158,263.
Patented Oct. 26, 1915.
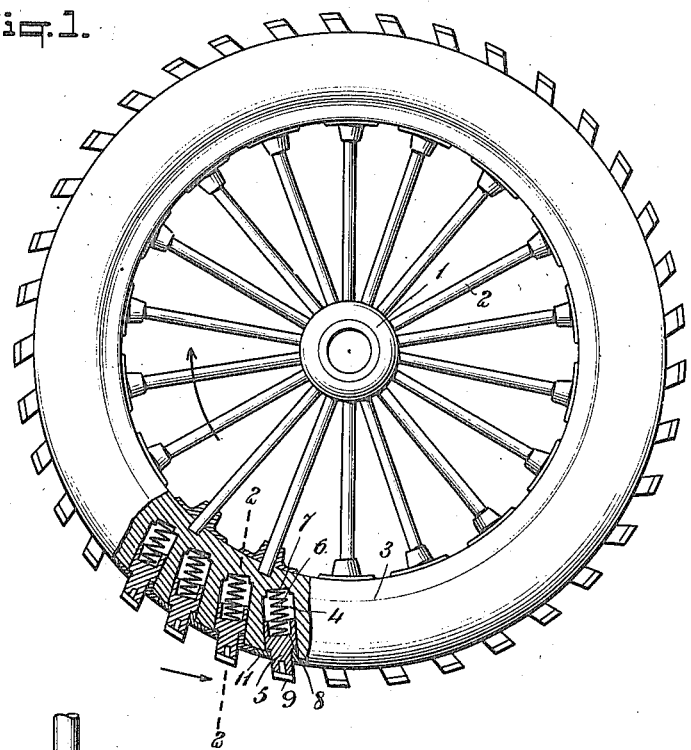
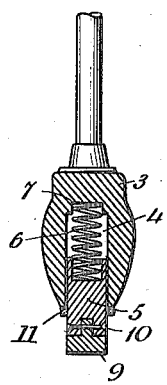
WITNESSES
INVENTOR
John F. Nettle
BY
ATTORNEYS

UNITED STATES PATENT OFFICE.

JOHN F. NETTLE, OF BUTTE, MONTANA.

RESILIENT WHEEL.

1,158,263.

Specification of Letters Patent. Patented Oct. 26, 1915.

Application filed November 7, 1913. Serial No. 799,681.

*To all whom it may concern:*

Be it known that I, JOHN F. NETTLE, a citizen of the United States, and a resident of Butte, in the county of Silverbow and State of Montana, have invented a new and Improved Resilient Wheel, of which the following is a full, clear, and exact description.

This invention relates to improvements in spring wheels, and has for an object to provide an improved structure which will not readily get out of order, and which will give a proper resilient or cushioned effect while in use.

Another object of the invention is to provide a wheel with a plurality of independent spring pressed contact members which may be independently depressed when striking an obstruction so as to give substantially the same effect as a pneumatic tire.

In carrying out the object of the invention a hub of any desired kind is provided to which is connected any desired kind of spokes. Arranged on the outer end of the spokes is a felly of special construction. This felly is provided with a plurality of sockets in which are arranged sliding plungers having a contacting outer face. Springs are associated with these plungers so that each plunger is independently held resiliently in an outer position.

In the accompanying drawing—Figure 1 is a side view of a wheel embodying the invention, certain parts being broken away for better disclosing the construction and arrangement; Fig. 2 is a section through Fig. 1 on line 2—2.

Referring to the accompanying drawing by numeral 1 indicates a hub of any desired kind having spokes 2 connected therewith. The outer ends of spokes 2 are suitably mounted or connected with a felly 3. The felly 3 is of special construction, and is provided with a plurality of bores 4 extending in a direction inclined to a radius. In each of the bores 4 is arranged a plunger 5 pressed by a spring 6. The spring 6 at one end rests in a socket 7 formed in the felly 3, and at the opposite end rests in a socket 8 formed in the plunger 5. The extreme outer end of plunger 5 is provided with a bearing member 9 which may be of any desired material, as for instance, metal, rubber or other suitable material. A retaining pin 10 is used for holding the shoe or contact member 9 properly in place. In order to prevent spring 6 forcing the plungers 5 out of the bores 4 a retaining plate 11 is provided for each of the plungers which is secured in any desired manner to the felly 3, as for instance by screws.

In arranging the wheel in position on a vehicle the wheel is preferably positioned so as to rotate in the direction shown by the arrow in Fig. 1. It will be noted that as the plungers are independently mounted an independent movement of each plunger is permitted, whereby any particular obstacle may be passed over without compressing a large number of the plungers. If desired, anti-friction members, as for instance rollers or balls, could be arranged on each side of the plungers 5 without departing from the spirit of the invention so as to cause the same to move back and forth more freely.

What I claim is—

In a resilient wheel of the class described, a solid felly formed comparatively thin but of an appreciable depth radially, said felly being formed with a plurality of bores, each of said bores extending in a direction inclined to a radius, whereby sockets are formed, a spring arranged in each of said sockets, a plunger arranged to project into each of said sockets, each of said plungers being provided with a road-engaging face and a shouldered bearing portion adapted to reciprocate in said sockets, said shouldered bearing portion engaging said spring and resiliently supported thereby, and means connected with said felly overlapping said shouldered portion for limiting the outward movement of said plungers.

In testimony whereof I have signed my name to this specification in the presence of two subscribing witnesses.

JOHN F. NETTLE.

Witnesses:
JOHN W. JOHNS,
SAMUEL BARKER, Jr.,